United States Patent [19]
Rai et al.

[11] Patent Number: 6,034,750
[45] Date of Patent: Mar. 7, 2000

[54] LIQUID CRYSTAL DISPLAY HAVING DETACHABLE LIGHT SOURCE

[75] Inventors: Yasuki Rai; Hisao Uehara, both of Ogaki; Yasushi Marushita, Gifu; Makoto Shimizu, Ogaki, all of Japan

[73] Assignee: Sanyo Electric Co., Ltd., Osaka, Japan

[21] Appl. No.: 09/246,488

[22] Filed: Feb. 9, 1999

[30] Foreign Application Priority Data

Feb. 10, 1998 [JP] Japan ................................. 10-028710

[51] Int. Cl.⁷ ........................ G02F 1/1335; G02F 1/1333
[52] U.S. Cl. .................................. 349/57; 349/58; 349/61
[58] Field of Search .................................. 349/57, 58, 61

[56] References Cited

U.S. PATENT DOCUMENTS 5,654,779  8/1997  Nakayama et al. ...................... 349/58
5,671,028  9/1997  Okano ........................................ 349/66
5,812,225  9/1998  De Lauzun et al. ...................... 349/67
5,828,427  10/1998  Faris ......................................... 349/67

*Primary Examiner*—William L. Sikes
*Assistant Examiner*—Heidi L. Eisenhut
*Attorney, Agent, or Firm*—Sheridan Ross P.C.

[57] ABSTRACT

A liquid crystal display (LCD) includes liquid crystal display panel located within a housing. A backlight source is detachably connected to the housing for providing light to the display panel. When the backlight source is removed from the housing, outside light, such as ambient light, provides light to the display panel. The LCD includes a light collecting lens which transmits light to the display panel and which is either covered by the backlight source or exposed to an external light source when the backlight source is detached from the housing. When the backlight source is detached, the LCD has a small size and light weight, making it convenient for carrying and using outdoors. The LCD also consumes less power when the backlight source is detached.

21 Claims, 3 Drawing Sheets

LIQUID CRYSTAL DISPLAY HAVING DETACHABLE LIGHT SOURCE

BACKGROUND OF THE INVENTION

This invention relates to a liquid crystal display, and more particularly to a reduction in the electric power consumed by a back light thereof.

A liquid crystal display (LCD) is fabricated by enclosing liquid crystal between electrode substrates each of which is made by forming transparent electrodes on a transparent substrate. Liquid crystal has an electro-optical anisotropy. Therefore, when a predetermined voltage is applied between the electrodes such that an electric field is formed over the liquid crystal, the liquid crystal demonstrates optical characteristics, which depend on the strength of the electric field. A plurality of pixels are formed on the LCD. Accordingly, if a different voltage is applied to each pixel, a display image is formed as an aggregation of pixels having desired brightness. Thus, in the LCD, the display image is formed by voltage control. The LCD has certain advantages in that it is small, thin, and has low electric power consumption. Accordingly, it is desirable to use LCDS in office automation (OA) device and audio video (AV) device applications. LCDs are often used in portable devices, which are frequently used out of doors. In such cases, an LCD has been developed which uses ambient light to allow the display image to be visualized. This use of ambient light significantly reduces the gross electric power required by the LCD.

FIG. 1 is a side cross-sectional view of a conventional LCD 100. The LCD 100 has an LCD panel 10, a light conducting plate 11 for supplying light to the panel 10, a light diffusing plate 12 for diffusing light in the plate 11 to irradiate a uniform plane of light on the panel 10 and a light reflecting plate 13 for reflecting light in the plate 11 randomly. The plates 11, 12 and 13 are disposed within a housing 40. Further, a light source 20 for transmitting light to the conducting plate 11 and a light collecting lens 30 for receiving ambient light, such as outdoor daylight, and providing it to the conducting plate 11 are accommodated in the housing 40. The light source 20 may be a fluorescent lamp having a reflector 21 disposed at the back thereof and the conducting plate 11 may be constructed of acrylic resin. Instead of using the diffusing plate 12 and the reflecting plate 13, diffusive processing and randomly reflective processing may be applied to the front surface and the back surface of the conducting plate 11, respectively, so that the conducting plate 11 can provide a diffusive function and a reflective function. A back light portion or an illumination portion is formed by the conducting plate 11, the diffusing plate 12, the reflecting plate 13, light source 20 and the lens 30. The lens 30 may be mounted to the conducting plate 11 or integral with the conducting plate 11. The housing 40 has an opening 41 for exposing the lens 30 to ambient light.

Light emitted from the light source 20 or light received through the lens 30 is passed through the conducting plate 11 and diffused by the diffusing plate 12, and then randomly reflected by the reflecting plate 13. The light is then irradiated on the LCD panel 10 from the diffusing plate 12 as a uniform plane light. The LCD panel 10 cannot emit light by itself. Thus, the LCD panel 10 is illuminated from behind. The light permeability of the LCD panel 10 is controlled in order to distribute the light passing through the LCD panel 10 in a desired pattern to allow images to be formed on the LCD panel 10.

Under an environment where plenty of ambient light exists, such as on a sunny day, the LCD panel 10 is irradiated by light coming only from the lens 30 without requiring light from the light source 20. Conversely, when there is insufficient ambient light available, such as in the interior of a house, the LCD panel 10 is irradiated by light from the light source 20. Accordingly, gross electric power is reduced when the use of the light source 20 is not required, resulting in only using drive power for the LCD panel 10.

However, light introduced from the collecting lens 30 and the light source 20 runs principally along the plane of the LCD panel 10. Therefore, a portion of the light from the light source 20 passes through the inside of the conducting plate 11 parallel to the plane of the panel 10 and leaks out of the LCD 100 from the lens 30. A portion of light received from the lens 30 to the conducting plate 11 also runs parallel to the plane of the panel 10 through the inside of the conducting plate 11, reflects at the reflector 21, and then runs back through the conducting plate 11, and again leaks out of the LCD 100 from the lens 30. Thus, the amount of light captured by the diffusing plate 12 and the reflecting plate 13 and irradiated toward the LCD panel 10 is reduced, which reduces the efficiency of the panel 10.

Even if the light source 20 and the collecting lens 30 are positioned at adjacent sides, for example, light is still leaked from the lens 30. Thus, as long as the light source 20 and the collecting lens 30 are positioned in the same plane, a portion of the light transmitted through the conducting plate 11 is leaked out through the lens 30.

Further, the light source 20 is disposed within the LCD body and is not removable. Accordingly, even when use of the light source 20 is not required, the LCD (10 must be always carried with the light source 20, making the LCD unnecessarily heavy.

FIG. 2 is a side cross-sectional view of a conventional reflective type LCD 200. A reflective type LCD panel 110 is enclosed within a housing 140. The reflective type LCD panel 110 may employ reflective type electrodes, which reflect ambient light. The reflective type electrodes are arranged at the inner side of the LCD panel. Alternatively, LCD panel 110 may employ transparent electrodes and a reflecting plate, which is provided at the inner side of the LCD panel to reflect ambient light. The reflective type LCD panel 110 receives light from the front, observer side, modulates it by liquid crystal, reflects it at the reflecting plate and radiates it back to the observer side. Accordingly, the LCD 200 does not require an internal or artificial light source, which results in consumption of only power for driving the LCD panel 110, thus allowing for an overall reduction of power consumption.

However, although the LCD 200 operates well in an environment where a plenty of ambient light exists, the display screen is dark and invisible when there is insufficient ambient light.

SUMMARY OF THE INVENTION

In light of the above, in accordance with a first aspect of the present invention, there is provided a liquid crystal display comprising: a housing; a liquid crystal display panel contained within said housing; and a light source portion detachably mounted to said housing to supply light to said liquid crystal display panel.

In accordance with a second aspect of the prevent invention, there is provided a liquid crystal display comprising: a housing; a liquid crystal display panel contained within said housing; an illumination portion for irradiating light on said liquid crystal display panel; a light collecting portion provided on said illumination portion and exposed to the exterior of said housing; and a light source portion detachably mounted to said housing to supply light to said illumination portion via said light collecting portion.

Further, in accordance with a third aspect of the present invention, there is provided a liquid crystal display comprising: a housing; a reflecting type liquid crystal display panel contained within said housing, said liquid crystal display panel having a pair of electrode substrates, transparent electrodes and reflective electrodes formed on said pair of electrode substrates and liquid crystal enclosed between said electrode substrates; and a light source portion detachably mounted to said housing for irradiating light on an observing surface of said liquid crystal display panel.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
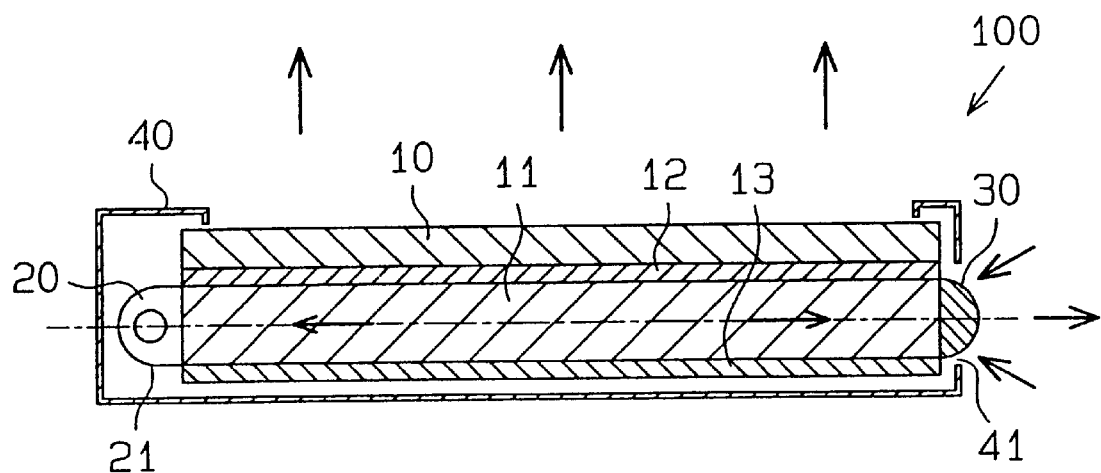
FIG. 1 is a side cross-sectional view of a first conventional LCD.
Figure 2:
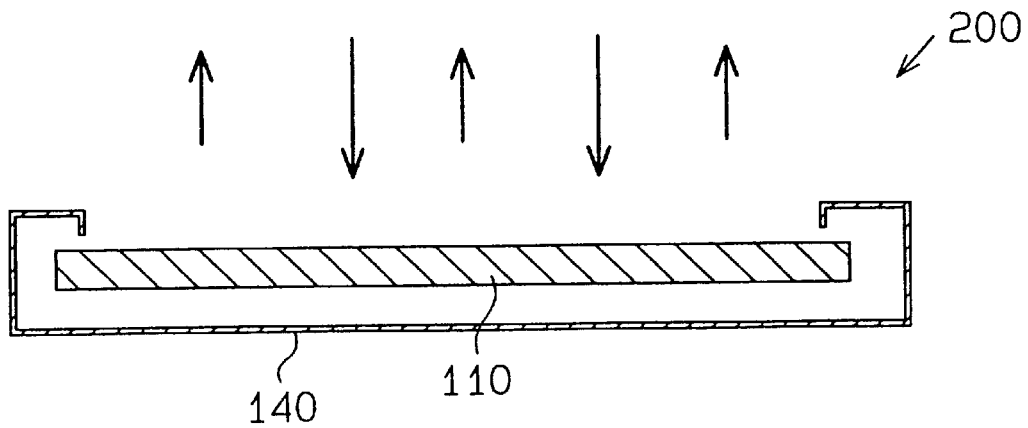
FIG. 2 is a side cross-sectional view of a second conventional LCD.

In the drawings, like numerals are used for like elements throughout.

Figure 3:
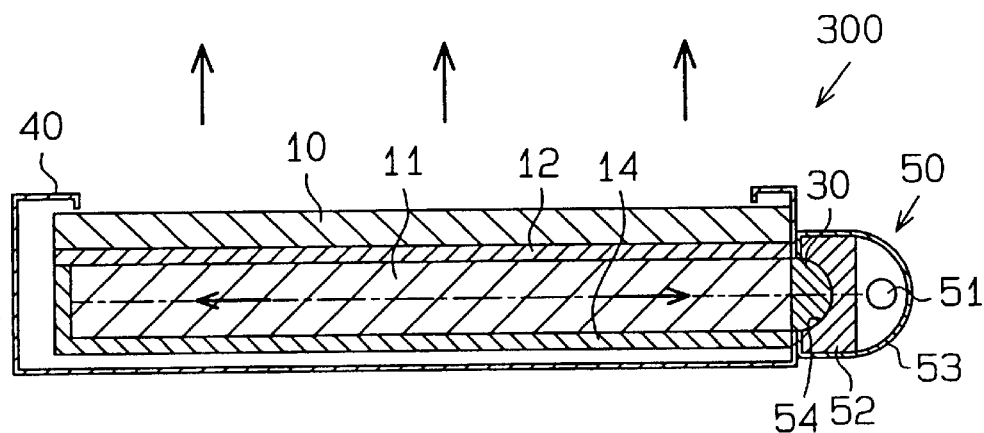
FIG. 3 is a side cross-sectional view of an LCD in accordance with a first embodiment of the present invention.

FIG. 3 is a side cross-sectional view of an LCD 300 in accordance with a first embodiment of the present invention. The LCD 300 comprises an LCD panel 10, a light conducting plate 11, a light diffusing plate 12, a light reflecting plate 14, a light collecting lens 30, a housing 40 for holding the plates 11, 12, 14, the panel 10, and the lens 30. The plates 11, 12, 14, the panel 10 and the lens 30 may be laminated together, as is known by those of skill in the art. The LCD 300 further includes a light source portion 50. It is preferable to use a resin plate such as an acrylic plate for the conducting plate 11. Instead of using the diffusing plate 12 and the reflecting plate 13, diffusive processing and randomly reflective processing can be applied to the front surface and the back surface of the conducting plate 11, respectively, so that the conducting plate 11 has a diffusing and a reflecting functions. Further, the lens 30 may be mounted to the conducting plate 11 or integral with the conducting plate 11. The lens 30 preferably comprises an acrylic resin and is formed in a semi-cylindrical shape with one side surface being generally rectangular. The conducting plate 11, diffusing plate 12, reflecting plate 13 and lens 30 form a back light as an illumination portion. The housing 40 has a window 41 for receiving light by way of the lens 30, which is exposed to the outside via the window 41.

The LCD panel 10 preferably has a built-in driver (not shown). In a panel having a driver built-in, display pixel portions and driver circuits at the peripheral thereof are integrally formed on the same substrate using thin-film transistors formed of polycrystalline semiconductors, such as polysilicon, as is known by those of skill in the art. This renders it unnecessary to mount driver ICs exterior to the LCD panel and accordingly the peripheral area of the display screen is reduced. As a result, further miniaturization and weight reduction of the LCD is achieved and an optimal portable LCD is obtained.

The light source portion 50 is detachably mounted to the housing 40. A light source 51 is provided within the light source portion 50. The light source 51 may comprise a point source of light, such as an LED, a linear light source, such as a cold cathode tube, or a surface light source, such as a fluorescent tube. The light source 51 could also be of other types, as are known to those of skill in the art. The light source portion 50 is preferably detachably mounted over the window 41 of the housing 40 by means of a magnet, an engaging structure, a hook, a fastening structure, etc. Preferably, the light source portion 50 covers substantially all of the lens 30 when attached to the housing 40.

Figure 4:
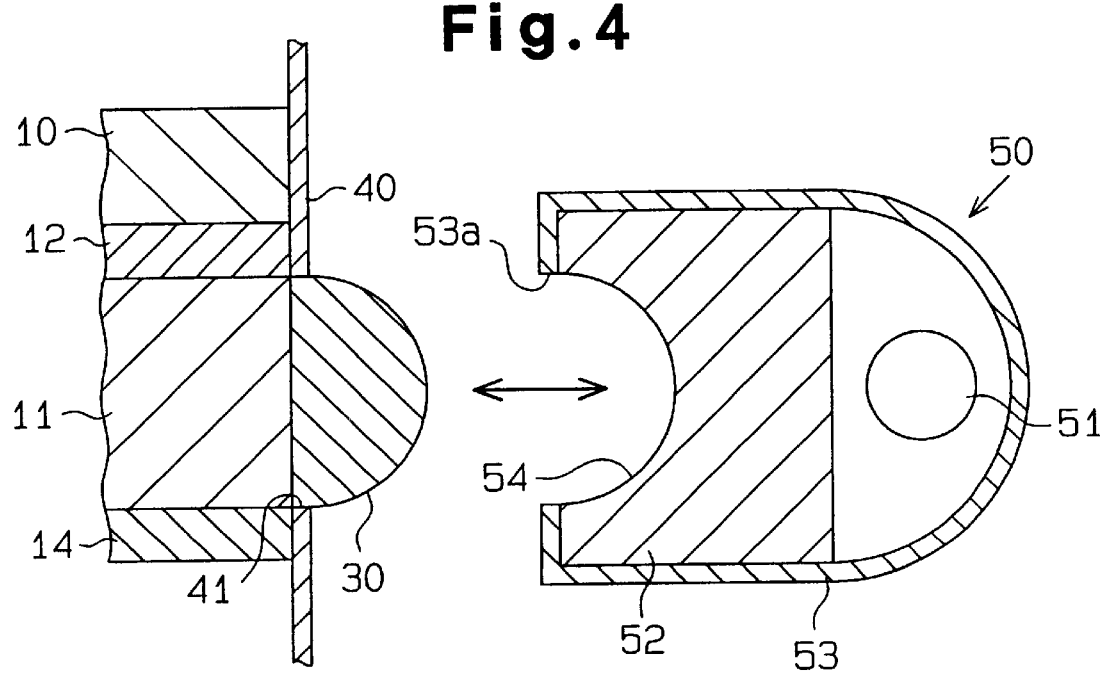
FIG. 4 is an enlarged cross-sectional view of an essential part of the LCD of FIG. 3.

FIG. 4 is an enlarged view of the light source portion 50 and the light collecting lens 30. The light source portion 50 comprises a light conducting portion 52 preferably made of a transparent acrylic resin, the light source 51 preferably being a fluorescent lamp, and a reflecting plate 53 surrounding the conducting portion 52 and the light source 51. The conducting portion 52 has a generally concave surface portion 54 coinciding with a convex surface shape of the lens 30 so that when the light source portion 50 is attached to the housing 40, the concave surface portion 54 is mated with the convex surface of the lens 30. The reflecting plate 53 has an opening 53a for exposing the concave surface portion 54 and receiving the lens 30.

When the light source portion 50 is mounted to the housing 40 as shown in FIG. 3, the concave surface portion 54 is engaged with the convex surface of the lens 30. In this condition, when the light source 51 is on, light emitted by the light source 51 is introduced into the conducting plate 11 through the conducting portion 52 and the lens 30. This light is eventually irradiated to the LCD panel 10 through the diffusing plate 12 and the reflecting plate 13. Accordingly, the LCD panel 10 can be used in an environment where there is little or no ambient light, such as inside a house, building, or vehicle or outdoors when sun light is not available. At this time, since the lens 30 is covered with the reflecting plate 53, light introduced from the light source 51 to the conducting plate 11 does not leak from the lens 30 to the outside of the housing 40. Accordingly, the light is efficiently used and a bright display screen is obtained.

Removing the light source portion 50 from the housing 40 exposes the lens 30 to the outside. In this state, external light is received through the lens 30 and introduced into the conducting plate 11, and irradiated to the LCD panel 10. Accordingly, when ambient light, or other externally generated light is available, the LCD panel 10 can be effectively used. In this condition, only electric power for driving the LCD panel 10 is consumed. Thus, total power consumption is reduced. Further, since the light source portion 50 is removed, miniaturization and lightening of the weight of the LCD 300 is achieved.

A power supply, such as a battery (not shown) exclusively used for the light source 51 many be mounted to the light source portion 50. In this case, the power supply for the light source 51 may be connected to a power supply for driving the LCD panel 10 via a connector (not shown) so that the power supply for the light source 51 is separated from the power supply of the LCD panel 10. Accordingly, replacement of the power supply for the light source portion 50 which may consume a large quantity of electric power is performed separate from replacement of the power supply for the LCD panel 10 This results in a longer life of the power supply battery for the LCD panel 10, thus lowering the frequency of replacing the battery.

Thus, in accordance with the first embodiment of the present invention, the light source portion 50 may be mounted to the housing 40 or removed from the housing 40.

Figure 5:
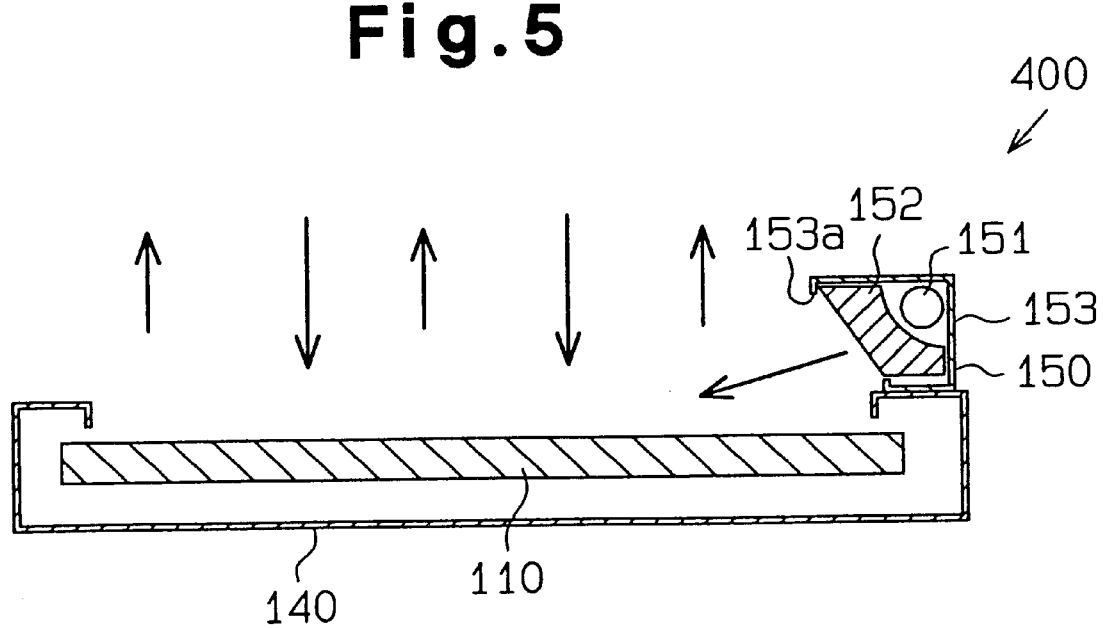
FIG. 5 is a side cross-sectional view of an LCD in accordance with a second embodiment of the present invention.

FIG. 5 is a side cross-sectional view of a reflective type LCD 400 in accordance with a second embodiment of the present invention. The LCD 400 comprises the reflective type LCD panel 110 enclosed within the housing 140 and a light source portion 150. In the second embodiment, the light source portion 150 is detachably mounted to the housing 140. The light source portion 150 has a light source 151 preferably comprising a fluorescent lamp or an LED, a light conducting portion 152 preferably made of acrylic resin, and a reflecting plate 153 surrounding the light source 151 and the conducting portion 152. The light source portion 150 is provided to be detachable from and mountable to the periphery portion of the housing 140 at a front side of the LCD panel 110 or an observer side, by means of a magnet, an engaging structure, a hook and a fastening structure or the like. The reflecting plate 153 has an opening 153a for permitting the passage of light from the light source 151 via the conducting portion 152. For example, it is envisioned that the light source portion 150 will be mounted to the housing 140, as shown in FIG. 5, when there is insufficient external light available to allow easy viewing of images displayed on the LCD 400. Light from the light source 151 is emitted through the conducting portion 152 and irradiated to the surface of the LCD panel 110, making the display screen visible. On the other hand, where external light is available, the light source portion 150 is removed from the housing 140, and the LCD 400 is used like a conventional reflective type LCD. With the light source portion 150 removed, the LCD 400 has a small size and light weight, making it suitable for carrying. The power supply battery for driving the LCD panel 140 may be provided separately from the power supply battery for the illumination portion 150. In this case, the frequency at which the battery is replaced is reduced.

As described above, in the liquid crystal display device having the light collecting portion for receiving ambient light, or in the liquid crystal display device of the reflective type, the light source portion 50 or 150 is mounted detachably to the housing 40 or 140. Accordingly, depending on the operating conditions, the LCD 300, 400 can be utilized in an optimal condition, and reduction of consumed electric power, miniaturization and lightening the weight of the LCD are achieved.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A liquid crystal display comprising:
    a housing;
    a liquid crystal display panel contained within said housing; and
    a light source portion detachably mounted to said housing to supply light to said liquid crystal display panel; and
    a light collecting portion for collecting ambient light, when said light source has been detached from said display, thereby allowing ambient light to reach said portion.

2. The liquid crystal display of claim 1, further comprising an illumination portion for irradiating light on said liquid crystal display panel from a back side thereof, wherein said light source portion introduces light into said illumination portion.

3. The liquid crystal display of claim 2, wherein said illumination portion has a light collecting portion for receiving ambient light and wherein said light source portion introduces light into said illumination portion via said light collection portion.

4. The liquid crystal display of claim 3, wherein said illumination portion includes a light conducting plate for introducing light from said light collecting portion, a light diffusing plate provided between said liquid crystal display panel and said light conducting plate for diffusing light from said light conducting plate to irradiate a generally uniform plane of light on said liquid crystal display panel, and a light reflecting plate provided on a side of said conducting plate opposite to said diffusing plate for reflecting light from said light collecting portion.

5. The liquid crystal display of claim 3, wherein said illumination portion comprises a light conducting plate for receiving light from said light collecting portion, and wherein diffusive processing and randomly reflective processing are applied to a front surface and a back surface of said light conducting plate, respectively.

6. The liquid crystal display of claim 4, wherein said light conducting plate is formed with acrylic resin and wherein said light collecting portion is formed with acrylic resin and is formed integrally with said light conducting plate.

7. The liquid crystal display of claim 4, wherein said light collecting portion is provided separate from said light conducting plate.

8. The liquid crystal display of claim 1, wherein said light source portion includes an electric power supply.

9. The liquid crystal display of claim 1, wherein said liquid crystal display panel is a reflective type and wherein said light source portion irradiates light to an observing surface of said liquid crystal display panel.

10. The liquid crystal display of claim 9, wherein said light source portion comprises a light source and a light conducting portion for leading light from said light source to the observing surface of said liquid crystal display panel.

11. A liquid crystal display comprising:
    a housing:
    a liquid crystal display panel contained within said housing; and
    a light source portion detachably mounted to said housing to supply light to said liquid crystal display panel;
    an illumination portion for irradiating light on said liquid crystal display panel from a back side thereof, wherein said light source portion introduces light into said illumination portion;
    a light collecting portion for receiving ambient light and wherein said light source portion introduces light into said illumination portion via said light collection portion;
    said light collecting portion includes a light collecting lens having a generally semi-cylindrical shape with one side surface being generally rectangular and wherein said light source portion comprises a light source, a light conducting portion having a concave surface portion corresponding to said light collecting lens and a reflecting plate surrounding said light conducting portion and said light source, except for said concave surface portion.

12. A liquid crystal display comprising:

a housing;

a liquid crystal display panel contained within said housing;

an illumination portion for irradiating light on said liquid crystal display panel;

a light collecting portion provided on said illumination portion and exposed to the exterior of said housing; and a light source portion detachably mounted to said housing to supply light to said illumination portion via said light collection portion; and a light collecting portion for collecting ambient light, when said light source portion has been detached from said display, thereby allowing ambient light to reach said portion.

13. The liquid crystal display of claim 12, wherein said illumination portion includes a light conducting plate for receiving light from said light collecting portion, a light diffusing plate provided between said liquid crystal display panel and said light conducting plate for diffusing light from said light conducting plate to irradiate a generally uniform plane of light on said liquid crystal display panel, and a light reflecting plate provided on a side of said light conducting plate opposite to said light diffusing plate for reflecting light from said light collecting portion.

14. The liquid crystal display of claim 12, wherein said illumination portion comprises a light conducting plate for receiving light from said light collecting portion, and wherein diffusive processing and randomly reflecting processing are applied to a front surface and a back surface of said light conducting plate, respectively.

15. The liquid crystal display of claim 13, wherein said light conducting plate and said light collecting portion are formed with acrylic resin and wherein said light collecting portion is formed integrally with said light conducting plate.

16. The liquid crystal display of claim 13, wherein said light collecting portion is provided separately from said light conducting plate.

17. The liquid crystal display of claim 12, wherein said light source portion includes an electric power supply.

18. A liquid crystal display comprising:

a housing;

a liquid crystal display panel contained within said housing;

an illumination portion for irradiating light on said liquid crystal display panel;

a light collecting portion provided on said illumination portion and exposed to the exterior of said housing; and a light source portion detachably mounted to said housing to supply light to said illumination portion via said light collecting portion;

wherein said light collecting portion includes a light collecting lens having a semi-cylindrical shape with one side surface being generally rectangular and wherein said light source portion comprises a light source, a light conducting portion having a concave surface portion corresponding to said light collecting lens and a reflecting plate surrounding said light conducting portion and said light source except for said concave surface portion.

19. A liquid crystal display comprising:

a housing;

a liquid crystal display panel contained within said housing;

a light source portion detachably mounted to said housing to supply light to said liquid crystal display panel, said light source portion comprising a light source, a light conducting portion and a reflecting plate surrounding said light conducting portion; and a light collecting portion for collecting ambient light, when said light source portion has been detached from said display, thereby allowing ambient light to reach said potion.

20. The liquid crystal display as set forth in claim 19, wherein said light collecting portion a light source and a light conducting portion.

21. The liquid crystal display as set forth in claim 20, further comprising a light collecting lens for collecting ambient light when said light source has been detached from said display, thereby allowing the ambient light to reach said lens.

* * * * *